United States Patent [19]

Freimuth et al.

[11] 4,206,587

[45] Jun. 10, 1980

[54] DISCHARGE MEANS

[75] Inventors: John H. Freimuth, New Holland; James T. Clevenger, Jr., Lancaster; Willis R. Campbell, Ephrata; Anthony F. Diederich, Jr., New Holland, all of Pa.

[73] Assignee: Sperry Rand Corporation, New Holland, Pa.

[21] Appl. No.: 866

[22] Filed: Jan. 4, 1979

[51] Int. Cl.² .................. A01D 75/00; A01D 39/00
[52] U.S. Cl. ................................. 56/341; 414/539
[58] Field of Search .................. 414/539, 509, 507; 56/341

[56] References Cited

U.S. PATENT DOCUMENTS

| 2,695,489 | 11/1954 | Lytle | 56/341 |
|---|---|---|---|
| 2,817,944 | 12/1957 | Callum | 56/341 |
| 3,688,944 | 9/1972 | Gagel | 414/509 |
| 3,859,909 | 1/1975 | Mast | 56/341 |

FOREIGN PATENT DOCUMENTS 1359300   3/1964   France ........................ 56/341

*Primary Examiner*—Russell R. Kinsey
*Assistant Examiner*—Paul J. Hirsch
*Attorney, Agent, or Firm*—Ralph D'Alessandro; Frank A. Seemar; Larry W. Miller

[57] ABSTRACT

In a crop roll forming machine adapted to be towed across a field, a kicker means is fastened to the opposing sides of the frame and extends at least partially therebetween adjacent the conveying means and the rear end so that upon completion of the formation of the crop roll the roll is ejected from the bale forming region into contact with the kicker means which propels it rearwardly of the roll forming machine.

19 Claims, 8 Drawing Figures

DISCHARGE MEANS

BACKGROUND OF THE INVENTION

This invention relates to a machine for forming large cylindrical bales of crop material, commonly called round bales, in a roll forming region above the ground. More specifically, it is concerned with apparatus which will permit a bale, once it is discharged onto the ground from the bale forming region, to be propelled sufficiently rearwardly of the machine to permit the tailgate to clear the discharged bale when the tailgate is closed.

Historically, it has been the custom to harvest forage crops by mowing the particular crop, letting it dry in the field, forming the dried crop material into windrows and passing a hay-baling machine over and along these windrows to form the crop material into rectangular bales. Recent practice has shown that the formation of crop material into large compact rolls, rather than rectangular bales as formerly done, permits the crop material to be deposited in roll form and left in fields for extended periods of time. The ability to leave these rolled bales in fields obviates the additional steps required in the traditional rectangular baling process of gathering the bales and transporting them to a storage area protected from the elements. This new technique of forming large round bales has created a baling system that can be conducted by one person. This is in marked contrast to the traditional practice of forming rectangular bales where the labor of several people was required to effect the cutting, drying, windrowing, baling, gathering and storing of the crop material.

Several methods of forming compact cylindrical rolls of crop material have evolved through the years. The most successful of these methods involves the forming of crop rolls by picking up a swath or windrow of material from the field and directing it onto a lower conveyor. This conveyor transports the material to a bale forming region where an upper apron or flight of belts, usually positioned above and adjacent the conveyor, moves in a suitable direction to rotate the crop material with which it is brought into contact. The increasing popularity of these crop roll forming machines has seen their use broaden from rolling wintering forage for livestock to rolling high protein crops, such as alfalfa, for dairy livestock. Therefore, these machines are the focal point of many ideas for developing both labor-saving and time-saving apparatus.

Crop roll forming machines that produce large cylindrical crop rolls utilize some form of a tailgate which is pivotally mounted to the frame of the machine. The tailgate is elevated upon completion of the crop roll or when it is desired to discharge a less than full size bale for any of a variety of reasons from the bale forming region. The tailgate follows a predetermined arc of travel, generally pivoting about a fixed point on the frame.

Prior crop roll forming machines generally discharge the completed crop material package from the bale forming region either by pivoting the tailgate rearwardly and upwardly, thereby permitting the bale to drop directly onto the ground, or by first elevating the tailgate and then activating the conveyor or lower apron which forms the lower limit of the bale forming region and upon which crop material is deposited by the pickup during the bale forming process. In the latter case, the bale is urged rearwardly out of the machine and onto the ground. Since these large cylindrical compact bales can vary in weight from as much as 850 to 1500 pounds or more, quite frequently in the machines of the latter type a bale receives a rearward urging that is sufficient merely to eject it from the floor of the bale forming region, but not sufficient to move it beyond the arc followed by the tailgate when it travels from its opened or raised position to its closed or shut position. This means that for both techniques of discharging a completed bale the discharged bale will interfere with the tailgate as it is closed prior to the machine's continuing across the field and initiating the rolling of an additional bale. This interference can have consequences that range from preventing the tailgate from closing to damaging the complete bale or causing costly structural damage to the machine itself.

Several choices are available to the operator of previous roll forming machines when closing the tailgate to avoid having the tailgate strike a bale which has been discharged insufficiently rearwardly. The machine can be moved forward over a portion of the preformed windrow of crop material to permit the tailgate to be closed after a bale is ejected. If the operator at that point desires to continue with the roll forming process, however, there will be a portion of the windrow that has been passed over and not picked up by the roll forming machine for inclusion in the crop roll. If the operator desires to include the passed over portion of the windrow, it is necessary to backup the roll forming machine and then begin the roll forming operation by moving forward again. A second approach is taken by operators who backup their machine prior to discharging the bale and pull forward again before closing the tailgate. Both approaches result in needless duplication of effort and waste of time every time a bale is ejected with insufficient force to carry it clear of the predetermined arc of travel of the tailgate. Alternately, if the operator attempts to start the pickup of crop material from the field for a new bale by discharging the bale at the point it is fully formed and then moving the machine forward while the tailgate is being lowered from the raised position to the closed position, crop material will be run through the bale forming region and out the back before the tailgate is closed. This will again present the problem of crop material being left on the field and not being included in the crop roll.

The foregoing problems are solved in the design of the machine comprising the present invention by providing means to discharge the completed crop roll sufficiently rearwardly of the roll forming machine each time a bale is discharged onto the ground to permit the tailgate to be closed and still clear of the discharged bale.

SUMMARY OF THE INVENTION

It is an object of the present invention to provide an improved crop roll forming machine that will discharge a completed crop roll sufficiently rearwardly behind the baler onto the ground so the tailgate will always be able to close and clear the discharged bale without having to move forward after ejecting the bale to close the tailgate.

It is a feature of the present invention to provide ejection assistance or kicker means that may either be fixedly fastened to the frame or pivotally mounted to the frame to assist in propelling the discharged bale rearwardly beyond the arc of the closing tailgate.

It is an advantage of this invention that crop material is not lost from the baling process by being passed over while it is in a windrow and left on the ground.

It is an additional advantage of the present invention that crop material is not lost from the baling process by being passed through the bale forming region and back onto the ground before the tailgate is closed and the roll forming cycle recommence.

It is a further advantage of the instant invention that the roll forming process requires less operator involvement and effort after completion of the information of a bale and prior to the recommencing of the process for an additional bale.

It is another advantage of this invention that the total amount of time necessary to discharge a completed crop roll and recommence the forming of an additional bale is substantially decreased.

These and other objects and advantages are obtained by providing in a crop roll forming machine adapted to be towed across a field a kicker means, fastened to the opposing sides of the frame and extending at least partially therebetween adjacent the conveying means and the rear end so that upon completion of the formation of the crop roll, the roll is ejected from the bale forming region into contact with the kicker means which propels it rearwardly of the roll forming machine.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

Figure 1:
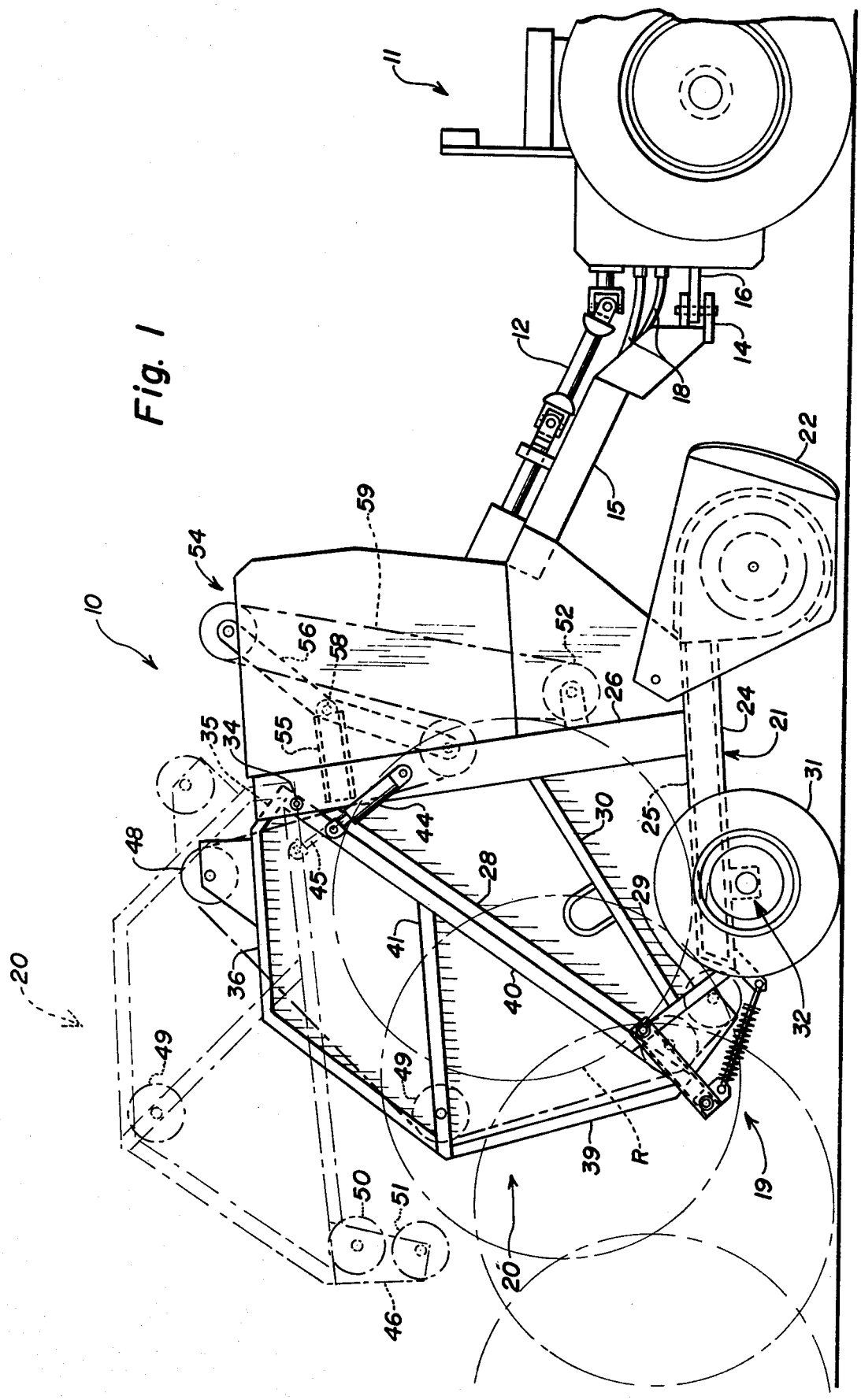
FIG. 1 is a side elevation view of a crop roll forming machine equipped with kicker means and attached to a partially illustrated tractor for towing.

Referring generally to the drawings and in particular to FIG. 1, there is shown a general representation of a crop rollforming machine 10 of the type illustrated in U.S. Pat. No. 3,859,909 to Mast, dated Jan. 14, 1975. The crop roll forming machine 10 is illustrated as being fastened to a towing vehicle such as a tractor 11 with a power take-off 12 providing the driving force for the mechanically operated components of the crop roll forming machine. The machine 10 is fastened via a towing hitch 14 mounted on a draft member 15 of the roll forming machine and approximately fastened to hitch member 16 of the tractor 11. Tractor hydraulic lines 18 provide the necessary fluid from the tractor's hydraulic reservoir (not shown) for the hydraulically operated components of the crop roll forming machine 10. The ejection assistance means or kicker means for the crop roll R is indicated generally by the numeral 19.

The roll forming machine 10 shown in FIG. 1 comprises generally an upper frame 20 and a lower frame 21. The lower frame 21 has mounted to its forward portion a pickup 22, normally tined, for collecting crop material deposited in preformed windrows on a field and delivering it to the roll forming machine 10. The lower frame 21 includes a horizontal beam member 24 to which is suitably fastened a floor 25. The floor 25 alternatively may be in the form of sheet metal with appropriate channels (not shown) having conveying chains running therealong, as illustrated in the aforementioned patent to Mast, or may consist of one conveyor belt rotatably mounted or any other means suitable for supporting crop material once it is delivered thereto by the pickup 22. Horizontal beam member 24 is connected at its forward end to a generally vertical beam member 26. A diagonal brace member 28 is appropriately fastened to the top of vertical beam member 26 and extends downwardly and rearwardly until it joins fixedly with angular brace 29 to its lowermost extremity. Angular brace 29 extends downwardly and forwardly until it is fixedly joined with horizontal beam member 24. Generally intermediately along brace 29 is a diagonal bracing member 30 which extends upwardly and forwardly until it is fixedly fastened to vertical member 26. This lower frame 21 is mobilely mounted to pair of wheels 31 (only one of which is shown) via a suitable axle and support beam indicated generally by the numeral 32.

Upper frame 20 consists of a tailgate pivotable about its mounting point 34 at the top of vertical member 26. The tailgate or upper frame 20 is formed from a series of interconnected bracing members 35, 36, 38, 39 and 40. A horizontal bracing member 41 connects bracing member 40 with members 38 and 39 at the latter's junction. Upper frame 20 is shown in FIG. 1 in solid lines in its closed or down position and in phantom in its raised or open position. The upper frame 20 is raised and lowered by means of a pair of hydraulic cylinders 42. The hydraulic cylinders 42 are mounted one on each side of the frame with the barrel end 44 being fastened to the vertical beam member 26 of the lower frame 21 and the rod end 45 being fastened to the bracing member 40 of the upper frame. Suitable hydraulic lines (not shown) are connected to opposite ends of the cylinders 42 to supply the fluid from the aforementioned tractor hydraulic reservoir for the selective activation of the hydraulic cylinders. As best seen in the elevated position of FIG. 1 the upper frame has an elongated section 46 of the type shown and described in co-pending U.S. Ser. No. 847,993, assigned to the assignee of the present invention.

The upper bale forming means travels about the periphery of the bale forming machine 10 on a series of appropriately mounted idler sprockets 48,49,50 and 51 and a drive sprocket 52. Drive sprocket 52 is suitably fastened to vertical member 26. A takeup mechanism indicated generally by the numeral 54 is fastened to bearing brackets 55, which are in turn secured to the upper portion of vertical member 26. The takeup mechanism 54 further includes a pair of pivotable parallel arms 56, one being positioned on each side of the frame. The takeup mechanism pivots about bearing 58 to permit the upper apron 59 to be played out about the periphery of the expanding crop roll R.

The details of the crop roll forming 10 are not described in further detail at this point because they are old and well known to one of ordinary skill in the art. It should be noted, however, for the purpose of the invention to be described hereafter that the upper apron 59 could equally well comprise chains interconnected by spaced apart parallel transverse elements, a series of expandable belts or a series of rollers arranged to form a curvilinear surface.

Figure 2:
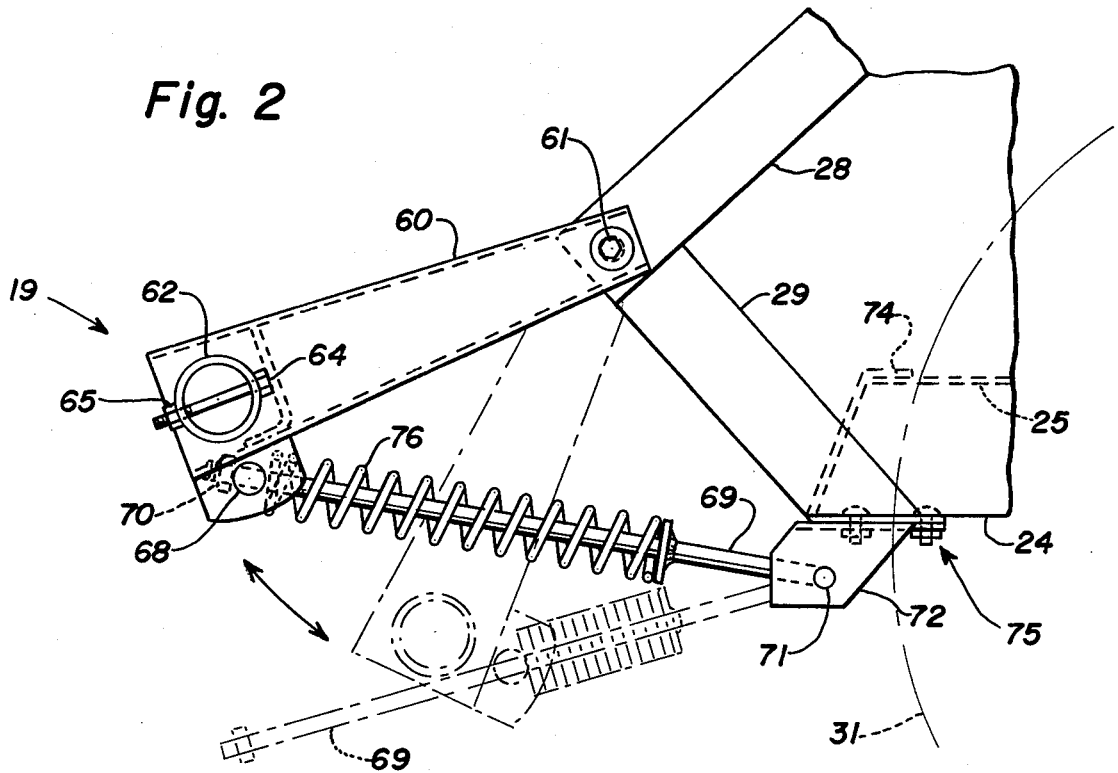
FIG. 2 is a side elevation view of the kicker means attached to the frame of the crop roll forming machine illustrating its action when subject to the load and non-load conditions caused by a crop roll passing over it.
Figure 3:
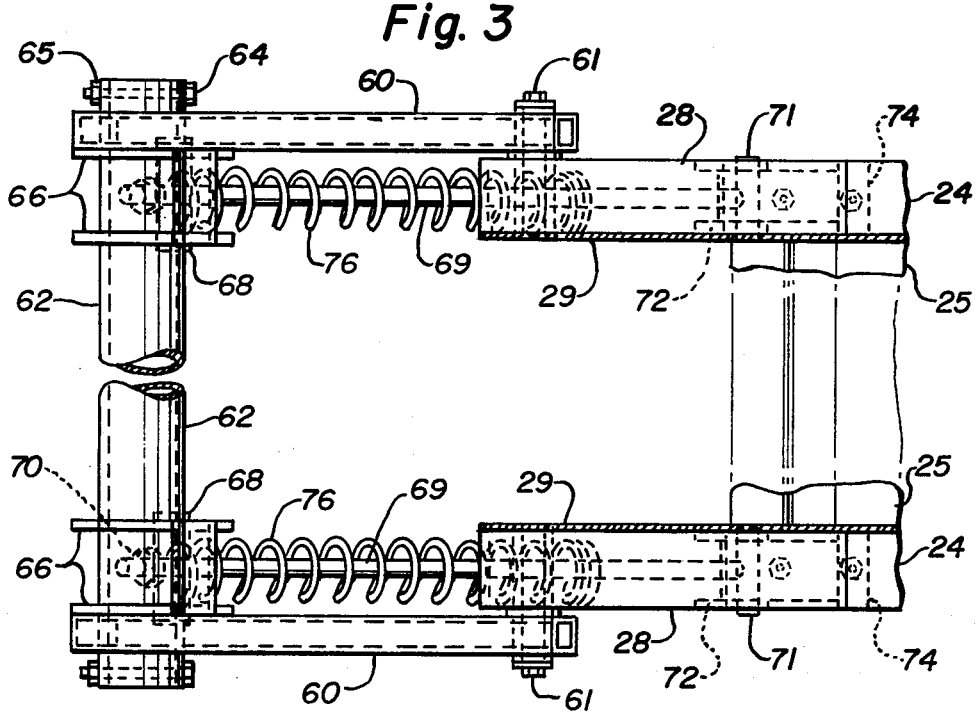
FIG. 3 is a top plan view of the kicker means with a portion of the intermediate structure cut away.

The kicker means 19, in its preferred embodiment, is shown in greater detail in FIGS. 2 and 3. Referring to FIG. 2 it is seen that kicker means 19 has a pair of parallel kicker arms 60 pivotally affixed to diagonal beam member 28 at journal 61. The opposing end of arm 60 has a transverse member 62 inserted within appropriately shaped openings in the arms 60. Transverse member 62 is preferably tubular in shape and is retained in position on both ends by a locking bolt 64 and a locking nut 65. Bolt 64 is inserted in suitably sized holes (not shown) within member 62 to restrict lateral movement of member 62. A pair of spring brackets 66 internally adjacent each of the arms 60 fit about transverse member 62. The outboard bracket plate of each spring bracket 66 is fixedly secured to the kicker means 60. Connecting and reinforcing each of the spring brackets 66 is a journal 68 through which passes spring rod 69. Spring rod 69 is threaded on its rear most end and has affixed thereto a stop nut 70. The opposing end of each spring rod 69 is pivotally journalled at 71 to a bracket 72. Bracket 72 is suitably fastened to horizontal beam member 24 and end plate 74 such as by nuts and bolts indicated generally by the numeral 75. Each spring rod 69 has affixed thereabout a coil spring 76 which is fixedly fastened at its forwardmost end to the rod in a suitable manner, such as by welding, and is slidably fastened thereto at its rearmost end.

Figure 7:
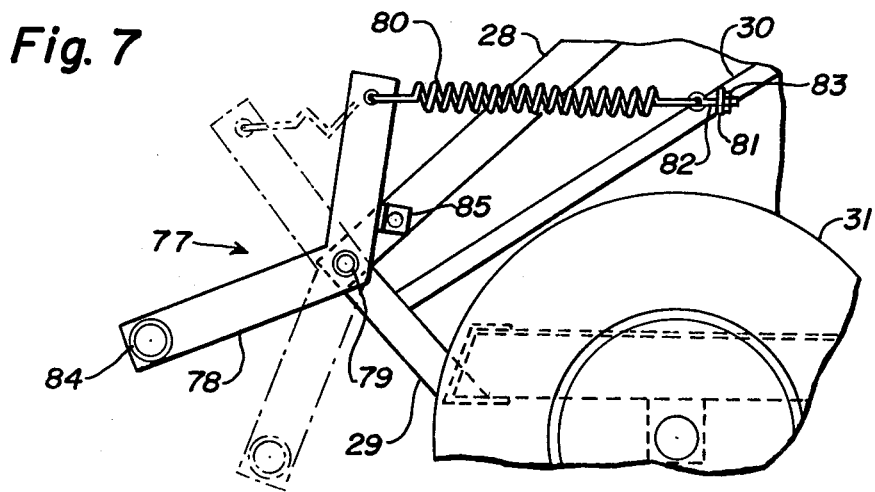
FIG. 7 is a side elevation of a first alternate embodiment of the kicker means mounted to the rear of the frame of the crop roll forming machine utilizing an extension spring connected to a pivot arm fastened to each side of the frame.

A first alternate embodiment of the kicker means is shown in FIG. 7 and indicated generally as 77. In this embodiment the kicker means 77 comprises a pair of angled arms 78 pivotally journalled at 79 to diagonal beam member 28. The top most part of each of angle arms 78 has an opening through which extension spring 80 is fastened. The opposing end of extension spring 80 is fastened to diagonal bracing member 30 in some suitable fashion such as a bracket 81, eyebolt 82 and retaining nut 83. It should be noted that any other suitable technique for anchoring the opposing end of extension spring 80 to the frame would be acceptable. The rearmost end of angled arms 78 has attached thereto in a suitable fashion a shaped transverse member 84 that spans substantially the width of the roll forming machine 10 and receives the completed bale as it is discharged onto the ground. Diagonal beam member 28 has a stop bracket 85 suitably affixed to establish the counterclockwise limit of rotation by the angled arm 78 in response to the biasing of the extension spring 80.

Figure 8:
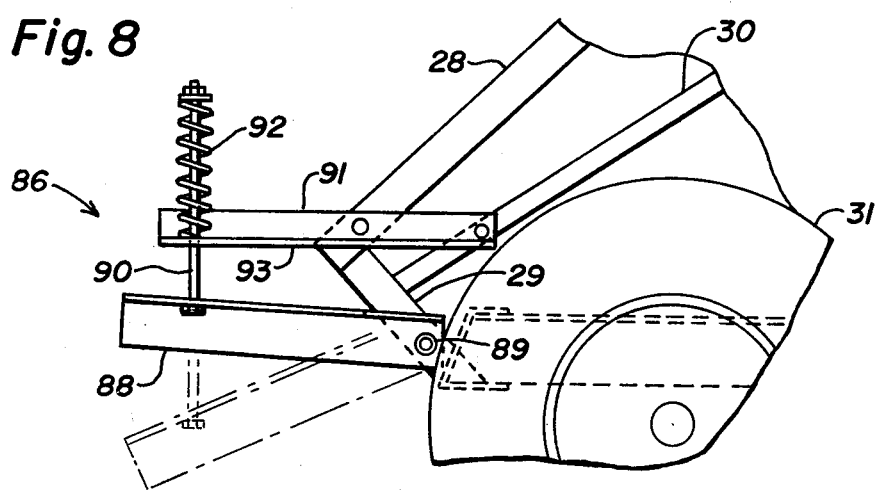
FIG. 8 is a side elevation of a second alternate embodiment of the kicker means that utilizes a pivotable ramp added to the rear of the roll forming machine's frame and which is spring loaded against the tailgate.

A third alternative embodiment of the kicker means is illustrated in FIG. 8 and is indicated generally by the numeral 86. A ramp 88 is pivotally journalled at 89 to angular brace 29. Spring rod 90 extends generally upwardly from ramp 88 through a suitable opening in biasing arm 91. Arm 91 is suitable fastened to diagonal beam member 28 and diagonal brace member 30 with sufficient strength to resist the biasing force applied to ramp 88 by coil spring 92. Ramp 88 is biased by spring 92, which is retained at its upper most portion on rod 90 either by welding, a locking nut and plate or the like, to resist the downward pivoting of ramp 88. The opposing end of coil spring 92 freely abuts the leg 93 of L-shaped biasing arm 91.

Figures 4, 5, 6:
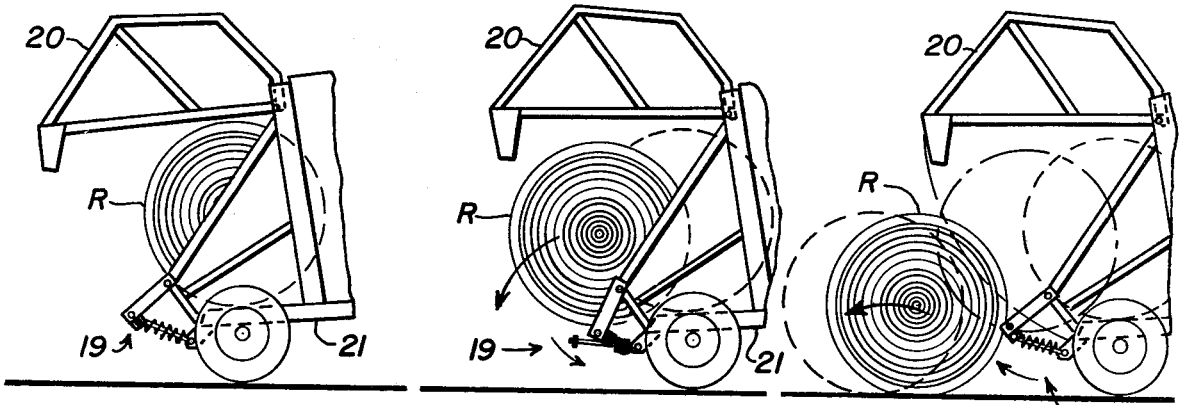
FIG. 4 is a partially diagrammatic view of a crop roll forming machine with the tailgate elevated and a completed crop roll about to be discharged.
FIG. 5 is a partially diagrammatic illustration of a crop roll forming machine with a completed crop roll exiting the roll forming machine and resting partially on the spring loaded kicker means.
FIG. 6 is a partially diagrammatic illustration of a crop roll forming machine showing the path taken by a completed crop roll as it is passed from the bale forming region onto the kicker means and then clear of the machine, further illustrating the action of the kicker means upon ejection of the completed roll.

In operation the roll forming machine 10 is passed over and along a preformed windrow or swath of crop material. The crop material is picked up from the ground by pickup 22 elevated upwardly into the bale forming region between the upper bale forming means or apron 59 and the floor 25. As the material is continuously fed into the roll forming machine 10, a cylindrically shaped bale R is formed. Concomitantly, the upper bale forming means or apron 59 is fed out to engulf the periphery of the ever expanding bale R by the rotation of the parallel arms 56 of the takeup mechanism 54. When sufficient crop material has been conveyed by the pickup 22 to the bale forming region to form a completed roll, the upper frame or tailgate 20 is elevated by the hydraulic cylinders to a position shown in FIG. 4. The bale is then discharged by the action either individually or combinatively of the bale forming means or upper apron 59 and suitable conveying means mounted generally in the floor 25 of the roll forming machine 10. This discharging action causes the completed crop roll R to roll rearwardly out of the bale forming region onto the kicker means, as indicated generally in FIG. 5. The kicker means, being pivotable, is then rotated downwardy as the roll passes over. Due to the spring biasing and the effective extension of the floor length, the roll is ejected and urged sufficiently rearwardly of the roll forming machine 10 so that the tailgate can be closed without interfering with the discharged roll R prior to again commencing the baling operation. This latter is best seen in FIG. 6, wherein the kicker means additionally is returned to its raised position by the biasing. Inherent in the structure and operation of the kicker means is the fact that each kicker means 60 works independently of the other within the free maneuver limits of the entire kicker means apparatus so that a bale unevenly weighted on one of its cylindrical ends will receive an ejecting force on each end directly proportional to the weight of the bale on each such end.

It should be noted that, although only spring biased and pivotable kicker means are illustrated herein, a rigid extension such as a non-pivoting ramp or transverse cross member that effectively extends the floor of the roll forming machine 10 would serve the same function. In this latter event, the rearward distance of the cross member must be small enough to ensure that the center line of the discharged crop roll R is either just atop the cross member or slightly behind it to permit the momentum of the discharged bale to carry it over the cross member and onto the ground with sufficient force to ensure its rolling free of the tailgate.

While the preferred structure in which the principals of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and arrangements of parts will occur to one of ordinary skill in the art art upon a reading of this disclosure.

Having thus described the invention, what is claimed is:

1. In a crop roll forming machine of the type having a mobile frame, a pickup, a bale forming region for receiving the crop material from the pickup, bale forming means for imparting motion to the bale, and drive means, the improvement comprising:
   a kicker means fastened to the frame for receiving the bale upon its discharge from the frame and propelling it rearwardly clear of the frame.

2. The roll forming machine, according to claim 1, wherein the kicker means is pivotally fastened to the frame.

3. An improved crop roll forming machine for rolling crop material into large cylindrical bales having a mobile frame, a pickup, conveying means for receiving the crop material from the pickup, bale forming means for imparting motion to the bale, a bale forming region and drive means, wherein the improved roll forming machine comprises:
   a kicker means fastened to the frame for receiving the bale during its discharge from the machine and propelling it clear of the frame.

4. The roll forming machine, according to claim 3, wherein the kicker means is pivotally fastened to the frame.

5. In a crop roll forming machine adapted to be towed by a prime moving vehicle comprising:
   (a) a mobile frame having a front end, two opposing sides and a rear end;
   (b) a pickup fastened to the frame for collecting crop material from a field;
   (c) conveying means mounted on the frame extending substantially between the two opposing sides and defining a plane along which crop material is received adjacent the front end from the pickup and transported rearwardly toward the rear end;
   (d) bale forming means rotatably mounted to the frame extending substantially between the two opposing sides providing a curvilinear motion-imparting surface against which crop material is directed by the conveying means and being expandable to substantially envelope a crop roll as it forms;
   (e) a bale forming region between the plane of the conveying means and the bale forming means being defined generally thereby and within which crop material is formed into a crop roll by the cooperative interaction of the bale forming means and the conveying means;
   (f) drive means mounted to the frame for driving the pickup, the conveying means and the bale forming means; and
   (g) kicker means fastened to the frame and extending at least partially between each of the two opposing sides of the conveying means and the rear end so that upon completion of the formation of the crop roll the roll is ejected from the bale forming region and contacts the kicker means which propels the crop roll rearwardly of the roll forming machine.

6. The crop roll forming machine, according to claim 5, wherein the kicker means comprises a ramp.

7. The crop roll forming machine, according to claim 6, wherein the ramp is fastened to each of the two opposing sides of the frame extending substantially therebetween, further being pivotable between a first position and a second position and being spring loaded so that upon contact by the crop roll the ramp pivots downwardly from the first position to the second position until the roll is discharged and then pivotally returns to the first position.

8. The crop roll forming machine, according to claim 5, wherein the kicker means comprises a cross member extending substantially between the opposing two sides.

9. The crop roll forming machine, according to claim 8, wherein the kicker means further comprises said cross member pivotally mounted to a pair of arms, each one of the pair being fastened to one of the two opposing sides, the arms being spring biased between a first position and a second position so that upon contact by the crop roll the arm pivots downwardly from the first position to the second position until the roll is discharged and then pivotally returns to the first position.

10. Apparatus for forming large generally cylindrical bales of crop material, which comprises:
    a generally upright mobile frame having an inlet, an outlet and two opposing sides;
    conveying means mounted on the frame extending substantially between the opposing sides and between the inlet and outlet to receive crop material transported rearwardly from the inlet towards the outlet;
    bale forming means rotatably mounted to the frame generally above the conveying means and defining therebetween a bale forming region;
    drive means mounted on the frame;
    a tailgate pivotally mounted to the frame adjacent the outlet and operable between a first position to permit crop material delivered to the conveying means to be transported rearwardly into contact with the bale forming means and a second position to permit a completed bale to be discharged from the bale forming region, the tailgate being movable in a predetermined arc therebetween;
    lifting means operable to move the tailgate between the first position and the second position; and
    kicker means affixed to the frame adjacent the outlet so that upon the raising of the tailgate to the second position the bale contacts the kicker means as the bale is discharged from the bale forming region and is propelled sufficiently rearwardly so that the bale is clear of the predetermined arc of the tailgate as the tailgate returns to the first position.

11. The crop roll forming machine, according to claim 10, wherein the kicker means comprises a ramp.

12. The crop roll forming machine, according to claim 11, wherein the ramp is fastened to each of the two opposing sides of the frame and extending substantially therebetween, the ramp further being pivotable between a first position and a second position and being spring loaded so that upon contact by the crop roll the ramp pivots downwardly from the first position to the second position until the roll is discharged and then pivotally returns to the first position.

13. The crop roll forming machine, according to claim 10, wherein the kicker means comprises a cross member extending substantially between the opposing two sides.

14. The crop roll forming machine, according to claim 13, wherein the kicker means further comprises said cross member pivotally mounted to a pair of arms, each one of the pair being fastened to one of the two opposing sides, the arms being spring biased between a first position and a second position so that upon contact by the crop roll the arm pivots downwardly from the first position to the second position until the roll is discharged and then pivotally returns to the first position.

15. Apparatus for forming large generally cylindrical bales of crop material, which comprises:
 a generally upright mobile frame having an inlet, an outlet and two opposing sides;
 a bale forming region on the frame extending substantially between the opposing sides and between the inlet and the outlet to receive crop material transported rearwardly from the inlet towards the outlet;
 a pickup mounted on the frame adjacent the inlet for collecting crop material and delivering it to the bale forming region;
 bale forming means rotatably mounted to the frame generally above the bale forming region;
 drive means mounted on the frame;
 a tailgate pivotally mounted to the frame adjacent the outlet and operable between a first position to permit crop material delivered to the bale forming region by the pickup to be transported rearwardly into contact with the bale forming means and a second position to permit a completed bale to be discharged from the bale forming region, the tailgate being movable in a predetermined arc therebetween;
 lifting means operable to move the tailgate between the first position and the second position; and
 kicker means affixed to the frame adjacent the outlet so that upon the raising of the tailgate to the second position the bale contacts the kicker means as the bale is discharged from the bale forming region and is propelled sufficiently rearwardly so that the bale is clear of the predetermined arc of the tailgate as the tailgate returns to the second position.

16. The crop roll forming machine, according to claim 15, wherein the kicker means comprises a ramp.

17. The crop roll forming machine, according to claim 16, wherein the ramp is fastened to each of the two opposing sides of the frame extending substantially therebetween, further being pivotable between a front position and a second position and being spring loaded so that upon contact by the crop roll the ramp pivots downwardly from the first position to the second position until the roll is discharged and then pivotally returns to the first position.

18. The crop roll forming machine, according to claim 15, wherein the kicker means comprises a cross member extending substantially between the opposing two sides.

19. The crop roll forming machine, according to claim 18, wherein the kicker means further comprises said cross member pivotally mounted to a pair of arms, each one of the pair being fastened to one of the two opposing sides, the arms being spring biased between a first position and a second position so that upon contact by the crop roll the arm pivots downwardly from the first position to the second position until the roll is discharged and then pivotally returns to the first position.

* * * * *